(12) United States Patent
Liu et al.

(10) Patent No.: US 11,037,048 B2
(45) Date of Patent: Jun. 15, 2021

(54) VIRTUAL CONVERSATION METHOD OR SYSTEM

(71) Applicant: MOVEWORKS, INC., Fremont, CA (US)

(72) Inventors: Chang Liu, Sunnyvale, CA (US); Ye Wang, Santa Clara, CA (US); Jing Chen, Redwood City, CA (US); Jiang Chen, Fremont, CA (US)

(73) Assignee: MOVEWORKS, INC., Mountain View, CA (US)

( * ) Notice: Subject to any disclaimer, the term of this patent is extended or adjusted under 35 U.S.C. 154(b) by 416 days.

(21) Appl. No.: 16/166,179

(22) Filed: Oct. 22, 2018

(65) Prior Publication Data

US 2020/0125919 A1 Apr. 23, 2020

(51) Int. Cl.
*G06F 40/30* (2020.01)
*G06N 3/00* (2006.01)
(Continued)

(52) U.S. Cl.
CPC ............ *G06N 3/006* (2013.01); *G06F 40/30* (2020.01); *G06N 5/048* (2013.01); *G06Q 30/0617* (2013.01); *G06Q 50/14* (2013.01)

(58) Field of Classification Search
CPC .. G06F 3/04842; G06F 3/167; G06F 3/04815; G06F 3/0482; G06F 40/30; G06F 3/011; G06F 3/017; G06F 3/0481; G06F 3/04845; G06F 3/013; G06F 3/04847; G06F 3/0485; G06F 16/90332; G06F 3/0346; G06F 40/35; G06F 9/453; G06F 3/04817; G06F 40/58; G06F 40/268; G06F 40/40; G06F 16/24575; G06F 16/24578; G06F 21/31; G06F 21/44; G06F 40/56; G06F 16/3329; G06F 16/35; G06F 16/635; G06F 16/9027; G06F 16/9538; G06F 1/163; G06F 3/012; G06F 3/02; G06F 40/117; G06F 40/211; G06F 40/289; G08B 19/005; G08B 25/008; G08B 27/003; G08B 29/185; G08B 25/002; G08B 27/005; G08B 3/10;
(Continued)

(56) References Cited

U.S. PATENT DOCUMENTS 7,505,892 B2   3/2009  Foderaro
9,424,840 B1   8/2016  Hart et al.
(Continued)

OTHER PUBLICATIONS

Combined Search and Examination Report dated Mar. 23, 2020, from the UK International Property Office, for Great Britain Application No. GB1913983.1, 8 pgs.

*Primary Examiner* — Robert G Bachner
(74) *Attorney, Agent, or Firm* — Ascenda Law Group, PC

(57) ABSTRACT

An automated conversation is facilitated between a user and a virtual agent. A system receives an input message from the user and analyzes an intent of the input message. Based on the intent of the input message, the system generates a plurality of bids for responding to the input message, and assigns an intent confidence score to each bid from the plurality of bids based on a confidence level of each bid from the plurality of bids. The system determines a winning bid from the plurality of bids based on the intent confidence score associated with each bid from the plurality of bids, and generates a response based on the winning bid.

18 Claims, 11 Drawing Sheets

(51) Int. Cl.
*G06Q 30/06* (2012.01)
*G06N 5/04* (2006.01)
*G06Q 50/14* (2012.01)

(58) Field of Classification Search
CPC ........ G08B 15/002; G08B 27/00; G08B 5/36; G08B 6/00; G06Q 10/083; G06Q 50/01; G06Q 10/10; G06Q 30/016; G06Q 10/0631; G06Q 10/063; G06Q 50/20; G06Q 30/0613; G06Q 50/28; G06Q 10/107; G06Q 10/0833; G06Q 10/103; G06Q 10/105; G06Q 10/109; G06Q 30/00; G06Q 30/002; G06Q 30/0201; G06Q 30/0617; G06Q 40/08; G06Q 50/14; G10L 15/22; G10L 15/1822; G10L 25/63; G10L 15/30; G10L 13/00; G10L 15/18; G10L 15/183; G10L 25/51; G10L 25/66; G10L 15/1815; G10L 15/193; G10L 2015/223; G10L 15/07; G10L 15/26; G10L 17/22; G10L 2015/228; G10L 13/033; G10L 15/02; G10L 2015/221; G10L 25/48; G10L 13/10; G10L 2015/088; G10L 2015/227

See application file for complete search history.

(56) References Cited

U.S. PATENT DOCUMENTS

| | | |
|---|---|---|
| 9,794,199 B2 | 10/2017 | Capper |
| 9,947,319 B1 | 4/2018 | Horling |
| 2012/0260263 A1 | 10/2012 | Edoja |
| 2017/0032791 A1 | 2/2017 | Elson et al. |
| 2017/0277993 A1* | 9/2017 | Beaver .................. G06F 40/40 |
| 2018/0012597 A1* | 1/2018 | Mathias ................ G06F 40/284 |
| 2018/0075847 A1 | 3/2018 | Lee |

* cited by examiner

VIRTUAL CONVERSATION METHOD OR SYSTEM

TECHNICAL FIELD

The present disclosure relates to virtual conversation systems and methods, and more particularly to, methods and systems for intelligently facilitating virtual conversations to handle unstructured conversations, and resolve complex user requests under various task categories.

BACKGROUND

In today's fast-paced and technology driven life, artificial intelligence and automation with the least human intervention has led to an era of robots like internet bot, chat bots, social bots, video game bots, etc. Most of the businesses are considering chat bots as their first layer of communication with the users, which includes recording a complaint, providing a solution to a query, helping in registration, inquiring, etc.

A chat bot is a software program designed to interact with the user in human-like behavior either in the form of texts or voice. The current challenges faced in chat bots are the capability to handle a single task at a time and to provide a solution for that task only, the lack of the capability to handle unstructured conversations or conversations in which the user switches topic. Also, individual tasks lack understanding of one another, and chat bots often make mistakes when deciding whether it is appropriate to forgo one task and switch to a new topic. In order to handle an unstructured conversation, some chat bots rely on vocabulary building to offer entertainment values in response to table talks, but they are also insufficient in resolving user requests which may fall in different task categories because vocabularies and intents used to design the chat bot are difficult to train and often ambiguous.

In view of the above discussion, there appears a need to provide an improved solution for facilitating a guided and interruption free conversation between a user and a bot to solve the above-mentioned problems.

SUMMARY

Various embodiments of the present disclosure provide methods and systems for facilitating an automated conversation between a user and a virtual agent.

In an embodiment, a method for facilitating an automated conversation between a user and a virtual agent, is disclosed. The method includes receiving, by a processor, an input message from the user. The method includes analyzing, by the processor, an intent of the input message. The method includes generating, by the processor, a plurality of bids for responding to the input message based on the intent of the input message. The method includes assigning, by the processor, an intent confidence score to each bid from the plurality of bids based on a confidence level of each bid from the plurality of bids. The method includes determining, by the processor, a winning bid from the plurality of bids based on the intent confidence score associated with each bid from the plurality of bids. Thereafter, the method includes generating, by the processor, a response based on the winning bid.

In another embodiment, a system for facilitating an automated conversation between a user and a virtual agent, is disclosed. The system includes a memory to store instructions, and at least one processor configured to execute the stored instructions to cause the system to receive an input message from the user and analyze an intent of the input message. The system is further caused at least in part to generate a plurality of bids based on the intent of the input message and assign an intent confidence score to each bid from the plurality of bids based on a confidence level of each bid from the plurality of bids. The system is further caused at least in part to determine a winning bid from the plurality of bids based on the intent confidence score associated with each bid from the plurality of bids, and to generate a response based on the winning bid.

In yet another embodiment, another method for facilitating an automated conversation between a user and a virtual agent, is disclosed. The method includes receiving, by the processor, an input message from the user. The method includes analyzing, by the processor, an intent of the input message. The method includes generating, by the processor, a plurality of bids based on the intent of the input message. The method includes assigning rank, by the processor, to each bid from the plurality of bids based on the intent confidence score associated with each bid from the plurality of bids. The method includes selecting, by the processor, top ranked bids based on the ranking of each bid from the plurality of bids. Thereafter, the method includes presenting, by the processor, a plurality of responses corresponding to the selected top ranked bids based on the selected top ranked bids.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
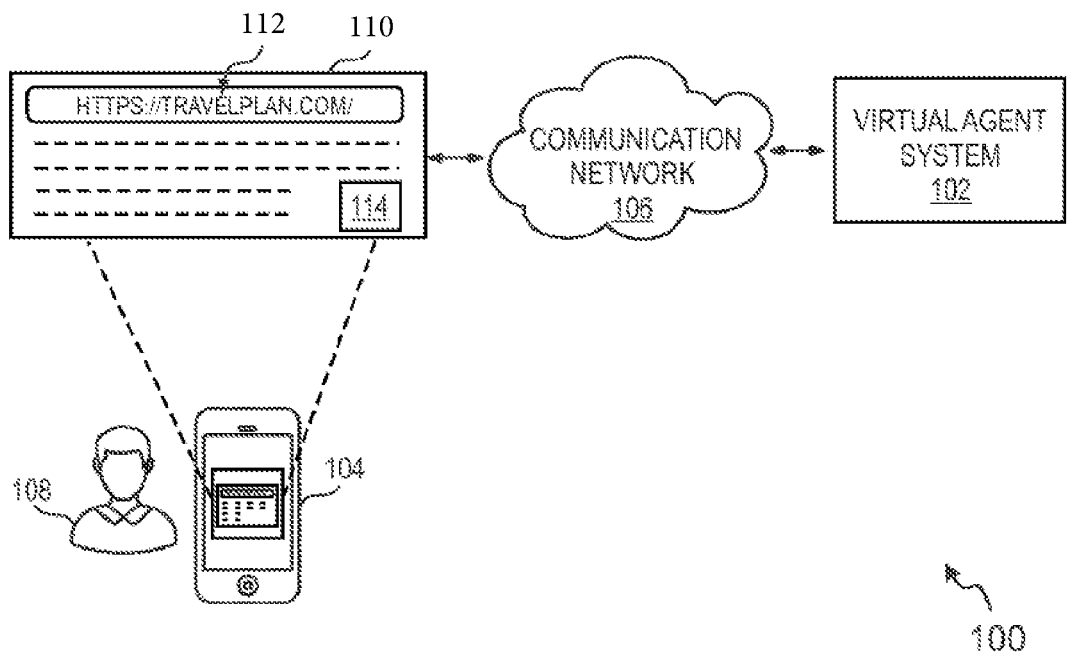
FIG. 1 is a simplified illustration of an environment in which a system, for conducting a conversation with a virtual agent system, is deployed, in accordance with some embodiments.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The various recitations of the phrase "in an embodiment" in the specification do not necessarily all refer to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide systems and methods for facilitating a conversation with a virtual agent system.

Various example embodiments of the present disclosure provide methods or systems, for facilitating a conversation between a user and a virtual agent using a bidding and auction model. Various embodiments further provide a virtual agent which can interact intelligently with the user for structured as well as unstructured conversations to enhance user experience and resolve requests received from the user in a time-effective and accurate manner. More specifically, the virtual agent system follows a bidding and auction model to generate a most accurate response for the user's request. The virtual agent system includes a processor, a memory, a plurality of bidding modules which are trained in a specific task and an auctioneer module in communication with the plurality of bidding modules. The memory includes one or more databases for storing at least one intent model, prior conversation records and machine learning models/algorithms. The virtual agent system receives an input message from the user via a user device. The input messages received from the user device may be stored within the one or more databases. The processor analyzes the input message to obtain at least one intent of the request from the user. The at least one intent is provided to each bidding module of the plurality of bidding modules. The plurality of bidding modules generates a bid and an intent confidence score associated with the generated bid based on the at least one intent. The intent confidence score indicates how accurately the bidding module understood the intent of the request of the user. The bid and the intent confidence score are sent to the auctioneer module which determines a winning bid from the plurality of bids received from the plurality of bidding modules based on the respective intent confidence score of the bids and a quality of service associated with each bid. Alternatively or additionally, the auctioneer module may also assign a rank to each bid of the plurality of bids based on the respective intent confidence score of the bids and a quality of service associated with each bid. The auctioneer module sends the winning bid or top ranked bids to the processor. The auctioneer module processes the plurality of bids simultaneously in order to avoid interruption due to any non-winning bid.

The processor determines a resolution confidence score of the virtual agent system. The resolution confidence score indicates the virtual agent system's capability to resolve a user request associated with the input message. The processor decides whether the winning bid or the top ranked bids can be presented to the user based on the determined resolution confidence score of the virtual agent system. If the resolution confidence score is high (e.g., greater than a threshold confidence score) then the processor determines an appropriate response based on the winning bid. Alternatively or additionally, the processor can determine a response for each top bid if the resolution confidence score is high. The processor presents the appropriate response or the response related to each top ranked bid to the user, otherwise, the processor generates a regret message to the user stating an incapability to resolve the user request received as the input message along with an remark providing reasons explaining the incapability to resolve the user request. Alternatively or additionally, the processor may also present at least one non-winning bid to the user with an explanation as to why a certain task is unavailable for the time being. It should be noted that the processor may present responses for one of the winning bid, top ranked bids or the non-winning bid via a dialog box rendered on the user device. The responses can be presented in the form of text messages, voice messages or audio-video messages.

Various example embodiments of the present invention are described hereinafter with reference to FIGS. 1 to 10. An environment for facilitating an automated conversation between a user and a virtual agent system is explained in detail with reference to FIG. 1.

FIG. 1 illustrates an exemplary representation of an environment 100, for conducting an automated conversation with a virtual agent, in accordance with some embodiments as disclosed herein. The environment 100 represents a virtual agent system 102 in communication with a user device 104 via a communication network 106. The user device 104 is associated with a user 108. In a non-limiting example, the virtual agent system 102 may be accessed via digital platforms associated with entities or hosted by entities such as webpage of a merchant, a retailer, or any entity facilitating a digital platform for offering goods and services to customers. The website 110 is displayed upon the user device 104 by entering a web uniform resource locator (URL), associated with the website 110, at a space 112 provided in a web browser using the user device 104.

In an example embodiment, the user device 104 may be a portable user device. Examples of the portable user device 104 include, but are not limited to, a smart phone, a personal digital assistant (PDA), and a laptop, among others. In some embodiments, the user device 104 may be a non-portable user device. Examples of the non-portable user device 104 include a personal computer (PC) and a kiosk, among others. The user device 104 may be a device that the user (e.g., the user 108) operates to browse the website 110 and to establish a conversation with the virtual agent system 102. The user 108 represents a customer visiting a website (e.g. the website 110) over the internet, and commencing a chat session with the virtual agent system 102.

The communication network 106 represents any distributed communication network (wired, wireless or otherwise) for data transmission and receipt between/among two or more points. The communication network 106 may as an example, include cellular telephone lines (cellular data networks such as 2G, 3G, 4G), LAN or WAN links, broadband connections (ISDN, Frame Relay, ATM), fiber net, or any other form of Internet or wired/wireless links, and so on. Preferably, the communication network 106 can carry TCP/IP protocol communications, and HTTP/HTTPS requests made by the user device 104 and the connection between the user device 104 and the virtual agent system 102 can be communicated over the communication network 106.

The virtual agent system 102 renders a dialog box 114 at the website 110. The dialog box 114 may be in a minimized form of display initially, as seen in FIG. 1. The dialog box 114 includes actionable buttons (shown in FIG. 4) for maximizing the size of the dialog box 114 from the minimized display size and vice versa. The actionable buttons further facilitate closing the display of the dialog box 114. Selection of the buttons may facilitate the dialog box 114 as a pop-up interface. Further, selection of the buttons may facilitate the dialog box 114 as an overlay interface over the pages of the website 110.

The communication between the user device 104 and the virtual agent system 102 starts when the user 108 browses the website 110 and initiates a chat session with the virtual agent system 102 by providing an input message either in the form of voice or text through the dialog box 114. The dialog box 114 may be preconfigured at the website 110. The dialog box 114 is made available at the user device 104 while the user 108 communicates with the virtual agent system 102 via the user device 104.

A plurality of users 108 can simultaneously communicate with the virtual agent system 102 while visiting websites, such as the website 110. The user 108 browsing the website 110 can learn about products and/or services offered by the corresponding entity of the website 110 by communicating with the virtual agent system 102 via the dialog box 114.

Figure 2:
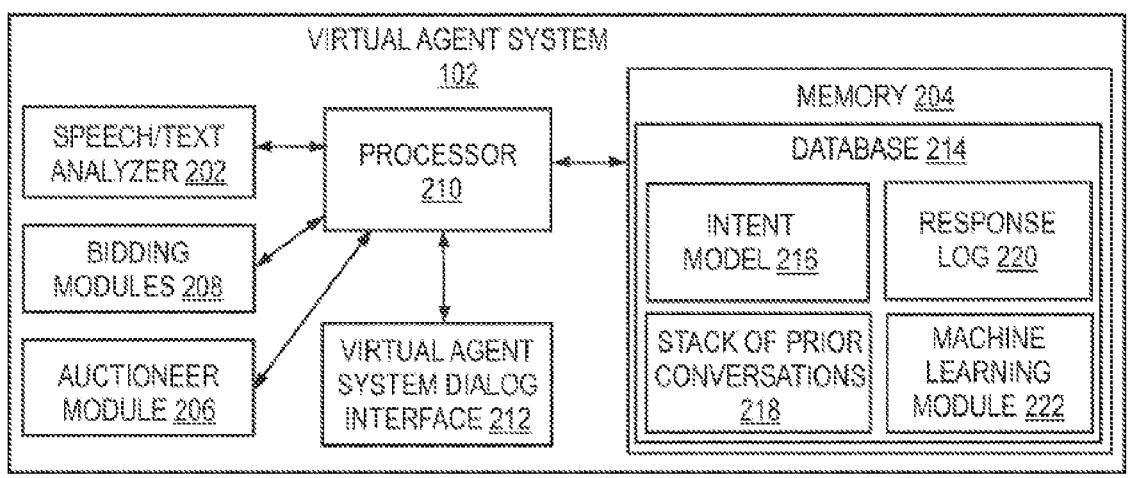
FIG. 2 illustrates a simplified block diagram of the virtual agent system, in accordance with an example embodiment.

FIG. 2 is a simplified illustration of the virtual agent system 102, in accordance with an embodiment. The virtual agent system 102 includes a speech/text analyzer 202, a memory 204, an auctioneer module 206, a plurality of bidding modules 208, a processor 210, and a virtual agent system dialog interface 212.

In the illustrated representation, the memory 204 includes a database 214 storing at least one intent model 216, a stack of prior conversations 218, a response log 220 and a machine learning module 222. It should be noted that memory 204 may include multiple such databases, and only one database is shown for the description purposes. In one example embodiment, all of the components 202-222 may be embodied within a processor such as the processor 210.

The speech/text analyzer 202 receives the user input message and parses the input message. The speech/text analyzer 202 sends the parsed input message to the processor 210 for analysis of the intent of the input message. The parsed input message can be temporarily stored in the processor 210 before analysis. The parsed input message is also stored in the intent model 216 of the database 214. The speech/text analyzer 202 is further configured to convert a voice message received as the input message into a text message and vice versa.

The intent model 216 includes an algorithm and data to identify an intent of the input message. The intent model 216 stores a plurality of intents retrieved during prior conversations between the user 108 and the virtual agent system 102. The intent model 216 is in communication with the speech/text analyzer 202 and the processor 210. The stack of prior conversations 218 corresponds to a record of prior conversations or chats between the user 108 and the virtual agent system 102. In an example, the stack of prior conversations 218 may include a log of an ongoing conversation between the user 108 and the virtual agent system 102. The prior conversations may correspond to one or more intents. The interaction between the virtual agent system 102 and the user 108 via the dialog box 114 allows the database 214 to store and process a plurality of input messages (messages, questions, etc.) as intents in the stack of prior conversations 218, which may be used for future conversations.

The input messages, without limiting the scope of the invention, may comprise texts, voice messages or audio-video messages. The input messages may be stored in the intent model 216. In an example embodiment, the intent model 216 may comprise pre-stored plurality of input messages along with respective intents as reference for the virtual agent system 102 to understand the intent of the input message. The input message includes questions asked by the user 108 to the virtual agent system 102, answers to questions posted by the virtual agent system 102 in response to the questions asked by the user 108, requests and commands to perform an action, among others. The intent model 216 stores a plurality of intents. The intent model 216 further stores parsed data corresponding to pre-stored or prior input message generated by the speech/text analyzer 202. The plurality of intents may represent a taxonomy or a class into which one or more input messages may be classified. Further, the plurality of input messages may be classified into one intent included in the intent model 216. It should be noted that one input message may include one or more intents.

The response log 220 includes a plurality of responses which may be presented to the user 108 as an answer to the input message. Response within the disclosure refer to texts, voice messages or audio-video messages provided by the virtual agent system 102 in response to input messages received from the user 108. The plurality of responses may be preconfigured into the response log 220. Responses received from the virtual agent system 102 may include questions and answers to questions posted by the user 108. The response log 220 may be updated frequently based on training of the virtual agent system 102 on a plurality of inputs and responses.

The input messages may be in the form of texts and/or audio. Audio input may include utterances, such as, sentences indicating an answer to a question or a question in response to a question. Likewise, the responses may be in the form of texts and/or utterances. Responses may include sentences indicating a question or an answer to a question. Responses are generated by the virtual agent system 102 based on the intent, according to a certain set of instructions. For example, an initial response message such as "Hi, how may I help you?" may be a special response message, which may be generated based on the user's action of browsing the website 110 or selecting (by clicking/pressing a button) the dialog box 114 at the website 110.

In an embodiment, the virtual agent system 102 may include the machine learning module 222. The machine learning module 222 includes algorithms used for generating suitable responses for questions asked to the virtual agent system 102 by the user 108. The machine learning module 222, in communication with the processor 210, helps in training the virtual agent system 102 to utilize the parsed input messages, the prior conversation records, and data stored in the database 214 to present an appropriate response to the user 108.

The plurality of bidding modules 208 including 'n' number of modules ('n' being an integer number) for example bidding module 1, bidding module 2, and bidding module 3. The processor 210 provides at least one intent associated with the input message to the plurality of bidding modules 208 in order to request for a bid (for example an answer or a solution to the input message from the user 108). Each bidding module may accept or reject the request based on their domain of expertise. If the bidding module accepts the request, it is configured to generate the bid based on the at least one intent received from the processor 210. Further, each bidding module assigns an intent confidence score with the generated bid to indicate an accuracy level of the bidding module's understanding of the at least one intent associated with the input message. Further, each of the bidding module 208 also assigns a flag to its respective bid. In one non-limiting example, the flag can be one of a high value flag, a low value flag and a negative value flag. The high value flag indicates that a possibility of the bid resolving a user request associated with the input message is high, the low bid flag indicates that a possibility of the bid resolving the user request is low, however a solution can be given which is relevant to the input message. Further, the negative bid indicates that no relevant solution can be provided for the user request by the respective bidding module. In an example, the plurality of bidding modules 208 generates their bids simultaneously. The plurality of bidding modules 208 may correspond to, in a non-limiting manner, application services or databases present in the virtual agent system 102 to assist the user 108, for example API, knowledge databases, search engines, among others.

The auctioneer module 206 is configured to receive a plurality of bids from the plurality of bidding modules 208. The auctioneer module 206 further determines a winning bid from the plurality of bids using the machine learning module 222, and one or more heuristic and manual rules. The auctioneer module 206 determines a winning bid and one or more non-winning bids from the plurality of bids based on the intent confidence score provided by the bidding modules 208 along with the bid, the flags associated with each bid, and a quality of service associated with each bid. Alternatively or additionally, the auctioneer module 206 may also rank the plurality of bids based on the intent confidence score, the flags associated with each bid, and the quality of service. The quality of service indicates a measure of user convenience associated with each bid (i.e. each solution or answer) provided by the bidding modules 208. For example, automatic and instant provision of a requested software has a higher quality of service than filing a request for this software to wait for manual provision by a human agent; fixing an issue automatically has a higher quality of service than pointing user to instructions of how to trouble shoot manually. An example of determining the winning bid is described in FIG. 3. The processor 210 is configured to receive the parsed input message from the speech/text analyzer 202 and is configured to analyze the parsed input message to obtain one or more intents associated with the input message. The processor 210 obtains the one or more intents using the machine learning module 222, the intent model 216, the stack of prior conversations 218, and the response log 220. The processor 210 is further configured to distribute the obtained one or more intents to the plurality of bidding modules 208. The processor 210 is further configured to receive the winning bid from the auctioneer module 206 to generate a response to the input message of the user 108. The processor 210 determines a resolution confidence score of the virtual agent system 102. The resolution confidence score indicates the virtual agent system's 102 capability to resolve the user request associated with the input message. For example, when the user 108 asks a question, and the virtual agent system 102 finds multiple related articles in the database 214, one article is more likely to provide a good answer than the other, and hence the more relevant article has higher resolution confidence for addressing the user question. Alternatively, the resolution confidence may be tagged high, medium or low based on "relevance score" between the question and the given answer which are determined using the machine learning model 222.

The processor 210 decides whether the winning bid can be presented to the user 108 based on the determined resolution confidence score of the virtual agent system 102. If the resolution confidence score is high, the processor 210 determines an appropriate response based on the winning bid using the response log 220 in the database 214. The processor 210 presents the appropriate response to the user 108 via the dialog box 114, otherwise the processor 210 generates a regret message to the user 108 stating an incapability to resolve the user request received as the input message. The processor 210 may also present an explanatory remark providing reasons of the incapability to resolve the user request. Alternatively or additionally, the processor 210 may also present at least one non-winning bid to the user 108 via the dialog box 114 with an remark explaining why a certain task is unavailable for the time being. The processor 210 may be a general purpose processor, a special purpose processor or graphical unit processor. The processor 204 may be a combination of one or more central processing units (CPUs).

The virtual agent system 102 includes the speech/text analyzer 202 and the auctioneer module 206. In an embodiment, the speech/text analyzer 202 and the auctioneer module 206 may be embodied within the processor 210.

The virtual agent system 102 may be a set of computer executable codes stored within a server. The virtual agent system 102 may be made available at the website 110 in order to facilitate conversation with the user 108 who browses the website 110. The virtual agent system 102 may be an application running at the server. The server may be a remote virtual server including but not limited to a cloud server. Alternatively or additionally, the virtual agent system 102 might be installed as a stand-alone application on a stand-alone device, such as the user device 104. The stand-alone application may enable the user device 104 to establish a chat session with the virtual agent system 102, as the website 110 is browsed using the user device 104.

Figure 3:
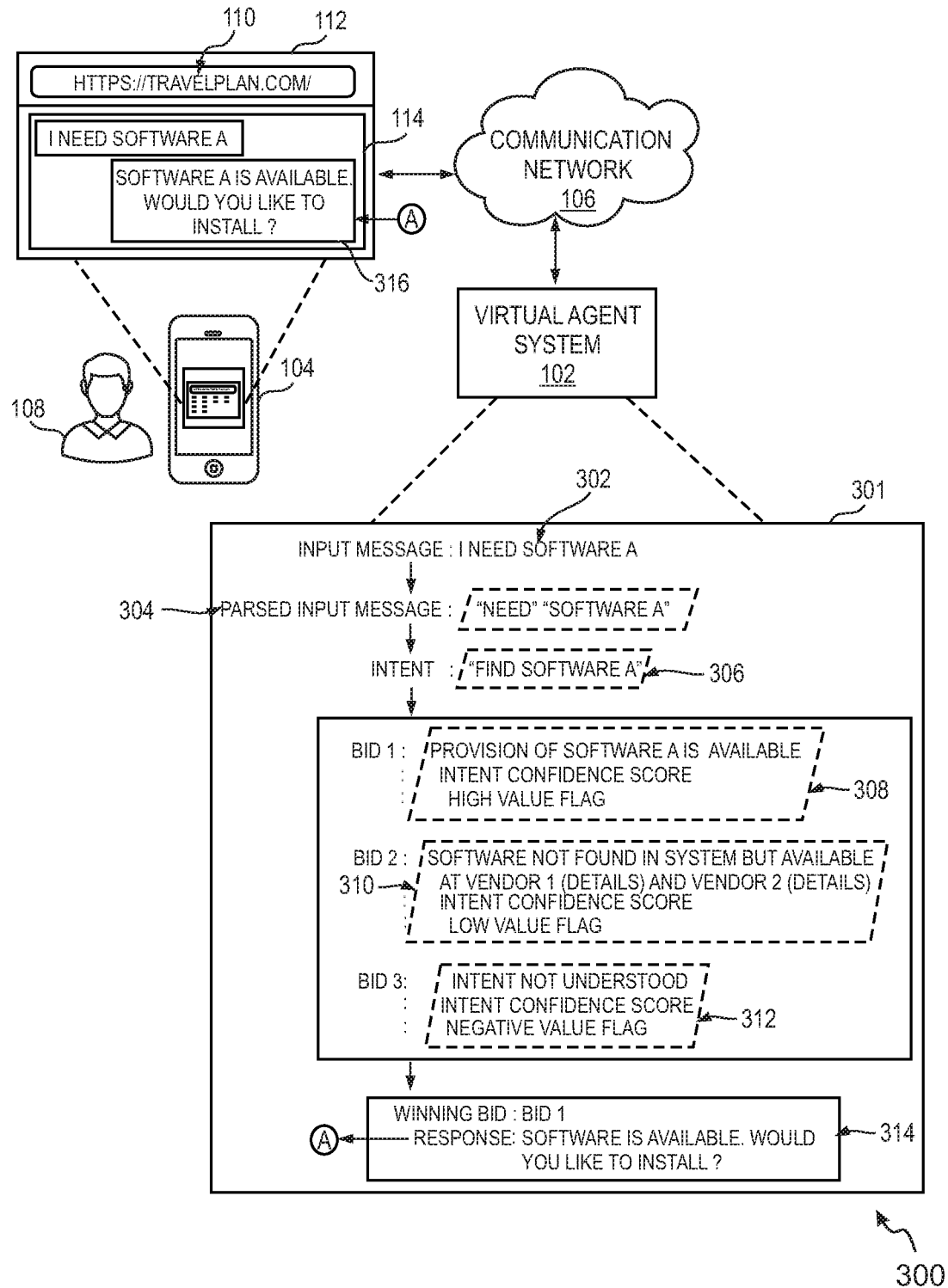
FIG. 3 is a simplified illustration of generating a plurality of bids by the bidding modules, and determining a winning bid by the auctioneer module, in accordance with an example embodiment.

FIG. 3 illustrates an example 300 of generating a the plurality of bids by the bidding modules 208, and determining a winning bid by the auctioneer module 206, in accordance with an example embodiment. For example, the input message provided by the user 108 is "I need software A" (see, 302). The virtual agent system 102 receives the input message and performs operations 304 to 316 (see, 301) to provide a response to the input message received by the user 108. First, the input message is parsed (see, 304) by the speech/text analyzer 202 into phrases such as "need" and "software A". The processor 210 analyzes the parsed input message and obtains one or more intents of the input message based on the intent model 216, the stack of prior conversations 218 and the machine learning module 222, such as "find software A" (see, 306). The processor 210 provides the obtained intent to the plurality of bidding modules 208, for example, bidding module 1, bidding module 2, and bidding module 3. The bidding module 1 is able to find software A and generates bid 1. Specifically, bid 1 includes the message "provision of software A is available", an intent confidence score along, and a high flag value (see, 308). The bidding module 2 is not able to find the software, but provides a few vendors from which the software is available along with some details. Specifically, bid 2 from bidding module 2 includes the message "software not found in system but available at vendor 1 (details), vendor 2 (details)", an intent confidence score, and low flag value (see, 310). Further, the bidding module 3 is not able to understand the intent of the input message provided by the processor 210. Accordingly, bidding module 3 generates bid 3 with the message "intent not understood", an intent confidence score that has the lowest value out of the three intent confidence scores, and a negative value flag (see, 312). All the bids (bid 1, bid 2 and bid 3) are provided to the auctioneer module 206. In turn, the auctioneer module 206 determines (see, 314) bid 1 as the winning bid, and bid 2 and bid 3 as non-winning bids. The processor 210 generates response according to winning bid 1 and presents the response (see, 316) to the user 108 via the dialog box 114.

Figure 4:
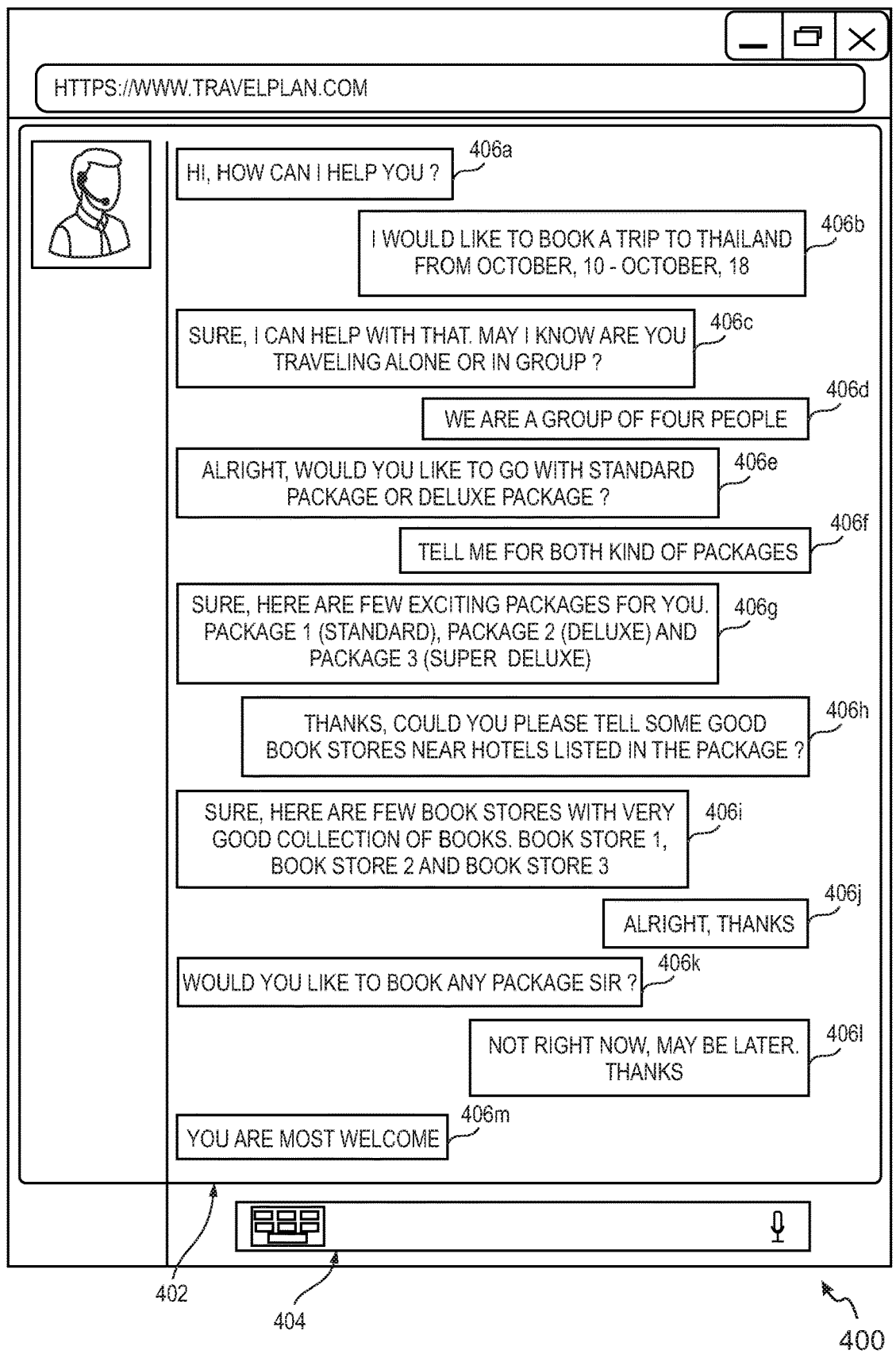
FIG. 4 illustrates a virtual agent system dialog interface facilitating a conversation between the user and the virtual agent system, in accordance with an example embodiment.

FIG. 4 illustrates a virtual agent system dialog interface 400 (such as the virtual agent system dialog interface 212) facilitating a conversation between the user 108 and the virtual agent system 102, in accordance with an example embodiment. The virtual agent system dialog interface 400 renders a pop-up window 402 (such as for example the dialog box 114) through which the user 108 can communicate with the virtual agent system 102 and provide input messages. Multiple actionable buttons 404 can be rendered on the pop-up window 402 for facilitating user operations such as clicking, typing, selecting, attaching files among others. A selection operation may comprise selecting a microphone to record a voice message, selecting a camera icon to take a picture, selecting a choice (for example a bid) provided by the virtual agent system 102 among others.

The pop-up window 402 displays a current conversation between the user 108 and the virtual agent system 102. For example, as shown in FIG. 4, a default message 406a is shown on the dialog box 114 by the virtual agent system 102 to initiate a conversation with the user 108, messages 406b, 406d, 406f, 406h, 406j, and 406l are input messages provided by the user 108 to the virtual agent system 102 and messages 406c, 406e, 406g, 406i, 406k, and 406m are responses provided by the virtual agent system 102 to the user 108 in response to the input messages 406b, 406d, 406f, 406h, 406j, and 406l. It shall further be noted that the messages boxes 406a-406m may not necessarily appear in the same order displayed in FIG. 4. In some scenarios, the virtual agent system 102 may post one or more response messages consecutively. Likewise, in some scenarios, the user 108 may post one or more input messages consecutively. In an example embodiment, the pop-up window 402 represents a field for receiving the URL associated with the website 110.

Figure 5:
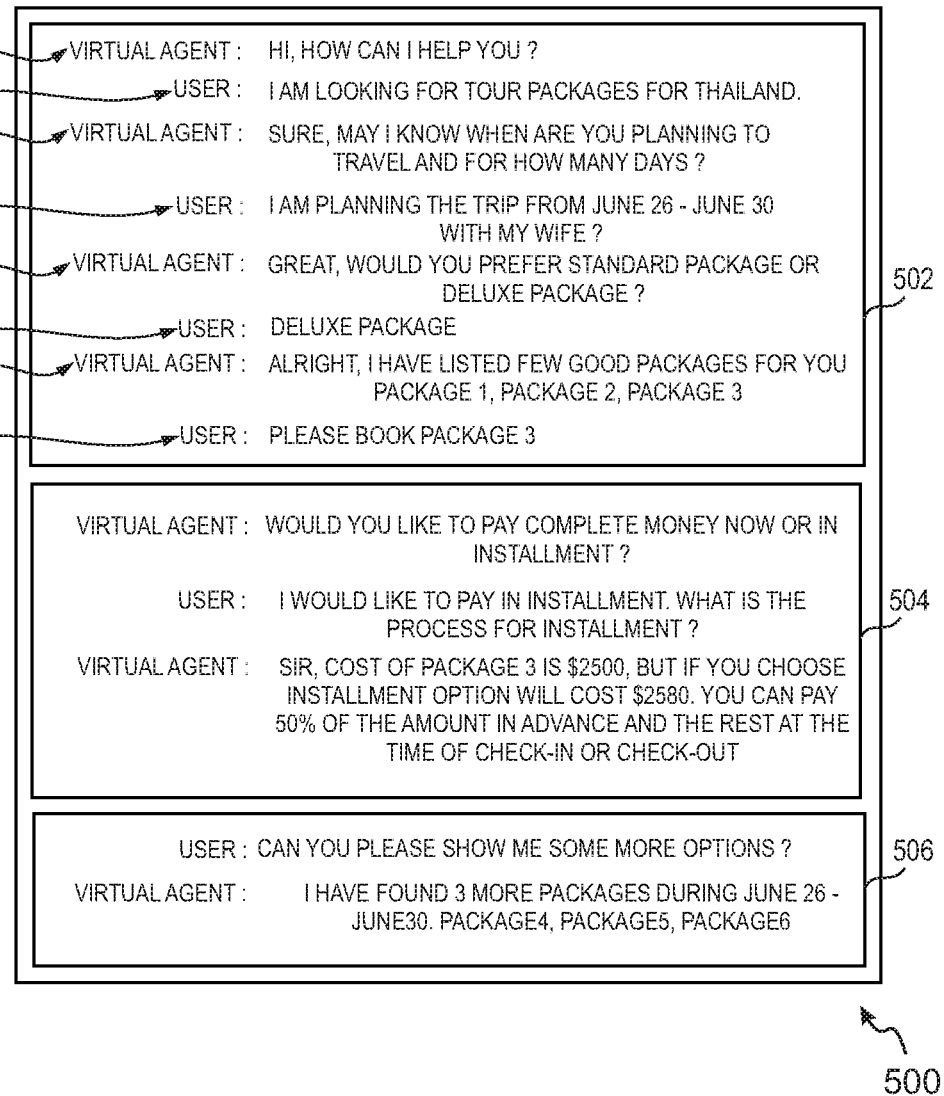
FIG. 5 is an illustration of a stack of earlier conversations stored in a database, in accordance with an example embodiment.

FIG. 5 illustrates an exemplary view 500 showing the stack of prior conversations 218 stored in the database 214, in accordance with an example embodiment. The stack of prior conversations 218 stores a log of current and earlier conversations that happened between the user 108 and the virtual agent system 102. In an embodiment, the processor 210 keeps track of each and every conversation taking place between the user 108 and the virtual agent system 102 and accordingly updates the stack of prior conversations 218 with additional conversations that occur between the user 108 and the virtual agent system 102.

As shown in FIG. 5, the stack of prior conversations between the user 108 and the virtual agent system 102 for at least one intent are shown which includes multiple conversation sessions between the user 108 and the virtual agent system 102 for example conversation session 502, conversation session 504 and conversation session 506. The conversation sessions 502, 504 and 506 may be related to one intent or different intents. Each conversation session includes input messages from the user 108 and responses provided by the virtual agent system 102. For example, the conversation session 502 includes utterances 502a, 502c, 502e, and 502g of virtual agent system 102, and utterances 502b, 502d, 502f and 502h of the user 108. Each conversation session indicates at least one intent. The processor 210 stores each conversation session along with their respective intent in the stack of prior conversations 218 in the database 214.

Figure 6:
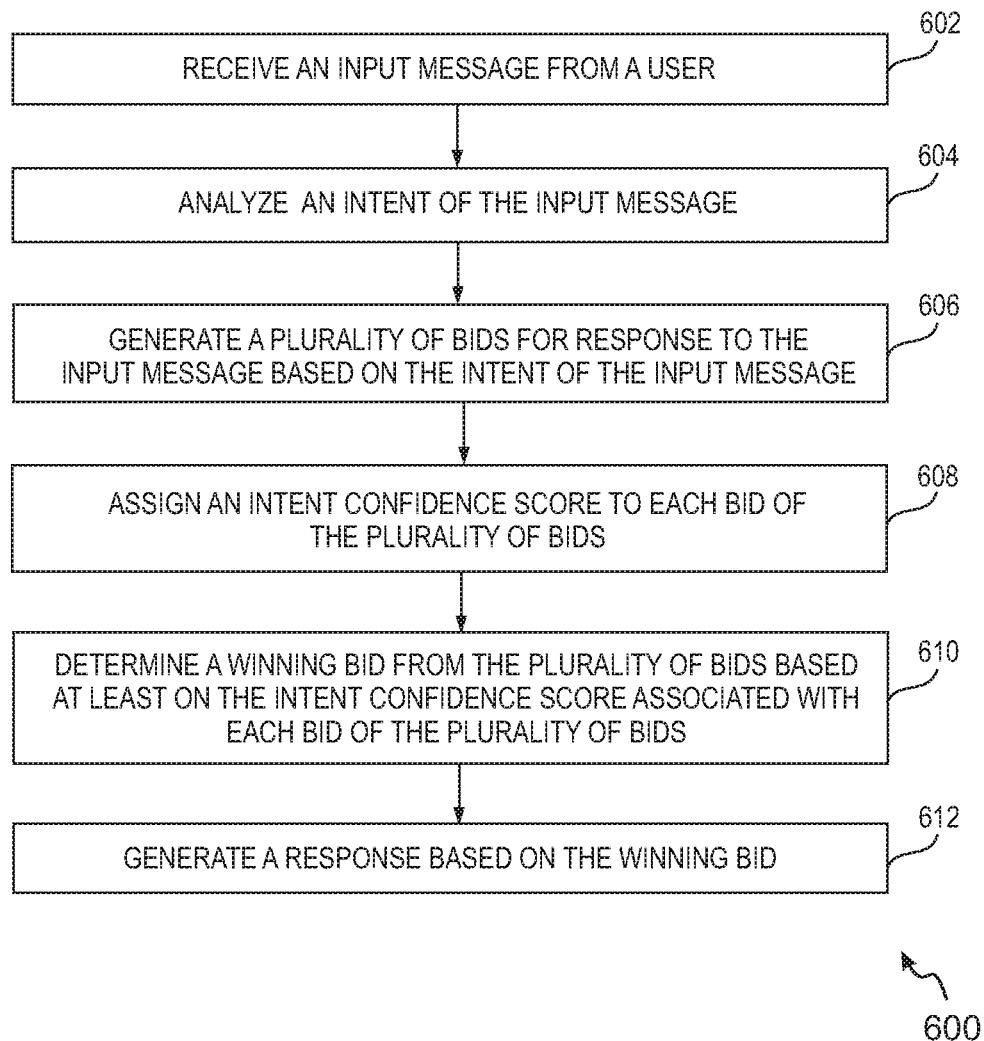
FIG. 6 illustrates a flow diagram representing a method of facilitating an automated conversation between the user and the virtual agent system, in accordance with an example embodiment.

FIG. 6 illustrates a flow diagram of a method 600 of facilitating an automated conversation between a user and a virtual agent, in accordance with an example embodiment. The method 600 depicted in the flow diagram may be executed by, for example, the virtual agent system 102. Operations of the flow diagram of the method 600, and combinations of operation in the flow diagram, may be implemented by, for example, hardware, firmware, a processor, circuitry and/or a different device associated with the execution of software that includes one or more computer program instructions. The sequence of operations of the method 600 need not be necessarily executed in the same order as they are presented. Further, one or more operations may be grouped together and performed in a single step, or one operation may have several sub-steps that may be performed in parallel or in a sequential manner.

At 602, the method 600 includes receiving, by a processor such as the processor 210, an input message from a user such as the user 108. The input message may be one of a voice message, a text message or an audio-video message, and may be in a question format. The input message may have at least one intent of the user related to a user request. For instance, as described with reference to FIG. 3, the user request is the need for software A.

At 604, the method 600 includes analyzing, by the processor, an intent of the input message. An example of analyzing the intent was also described with reference to FIG. 3.

At 606, the method 600 includes generating a plurality of bids (e.g., B1, B2, B3) for responding to the input message based on the intent of the input message. It is noted that the bids may be generated by applications also referred to as bidding modules (e.g., the bidding modules 208). Each of the applications may be able to serve the user request present in the input message, and may be willing to participate in serving the user request.

At 608, the method 600 includes assigning an intent confidence score to each bid of the plurality of bids. For instance, the intent confidence scores such as S1, S2, and S3 are assigned to the bids B1, B2 and B3, respectively. In an example embodiment, each of the bidding modules may provide corresponding intent confidence score.

At 610, the method 600 includes determining a winning bid from the plurality of bids based at least on the intent confidence score associated with each bid of the plurality of bids. For instance, the processor considers the intent confidence scores S1, S2 and S3 for the bids B1, B2 and B3 to determine the winning bid. In an example, the bid B1 may be determined as the winning bid.

Alternatively or additionally, the method 600 includes determines a ranking of the bids B1, B2 and B3 based at least on the intent confidence score associated with each bid of the plurality of bids. An example of the ranking of bids may be R1, R2 and R3, where R1 is B1, R2 is B3 and R3 is B2, where R1 is the top ranked bid, and R3 is the lowest ranked bid.

At 612, the method 600 includes generating a response based on the winning bid. Alternatively, in the embodiment where the processor provides the ranking of bids, the operation 612 may be performed by generating a response based on one or more of the top ranked bids from the ranking of bids.

Figure 7A:
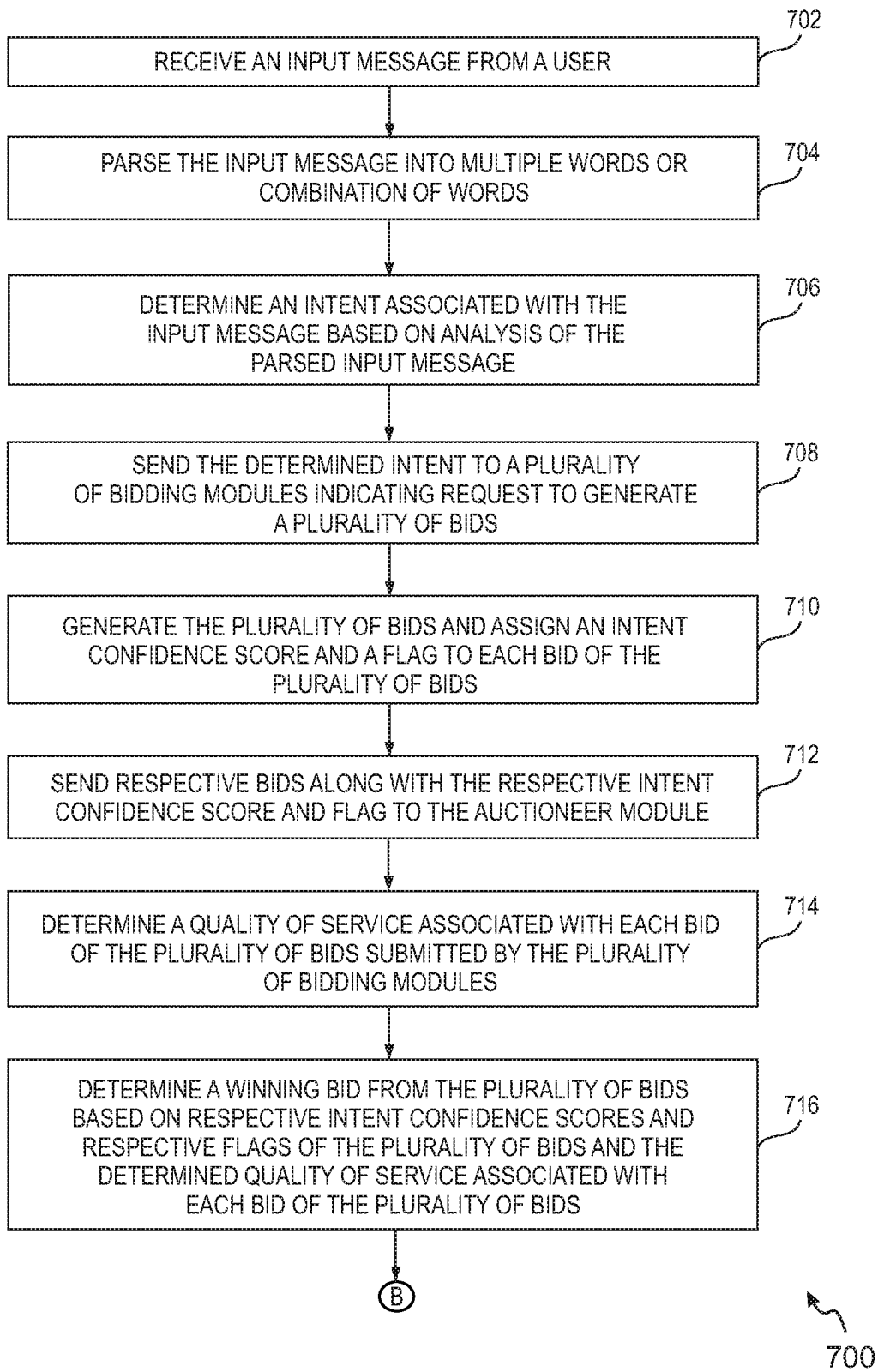
FIGS. 7A and 7B illustrate a flow diagram representing a method for conducting a conversation with a virtual agent system, in accordance with an example embodiment.
Figure 7B:
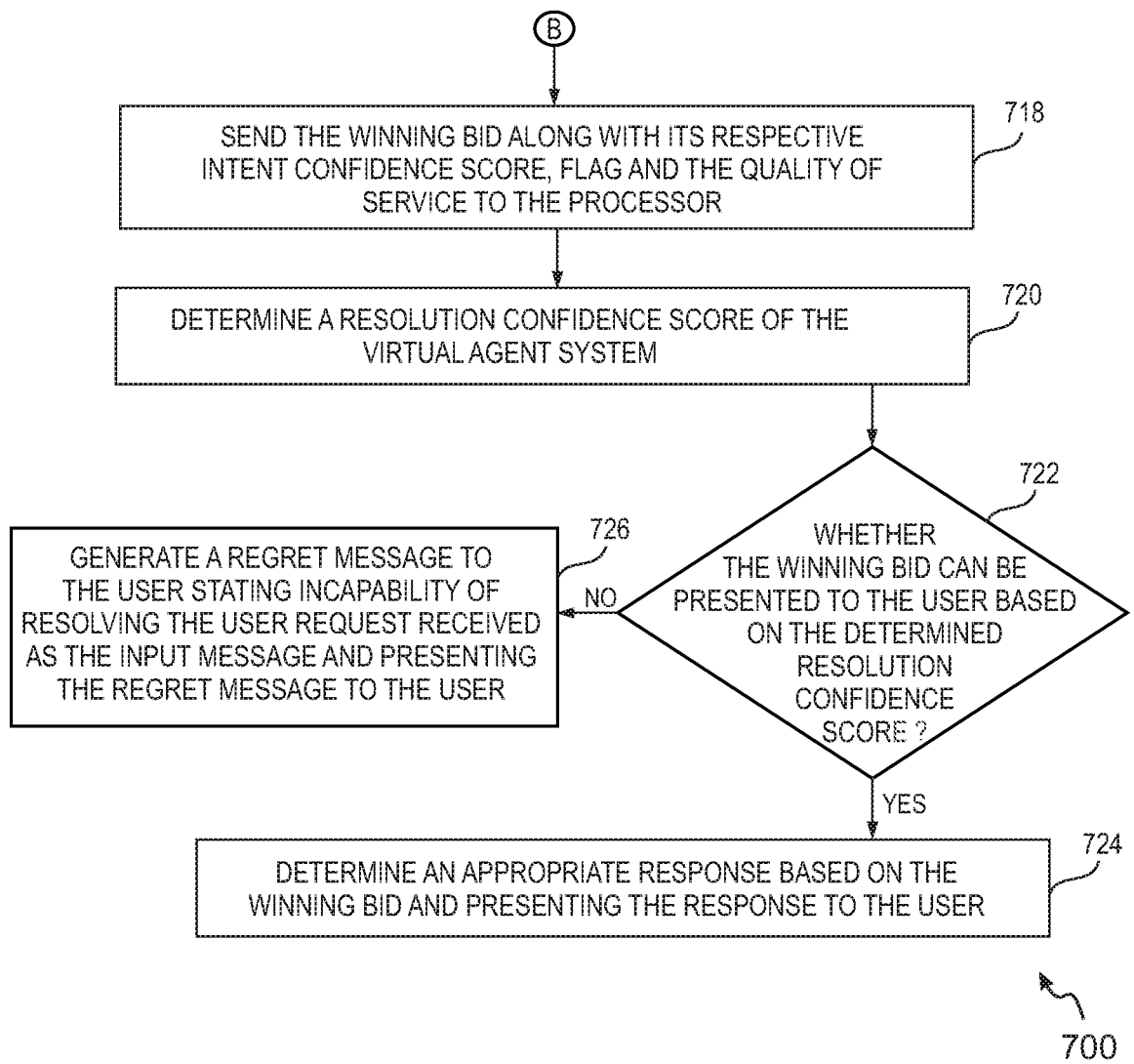

FIGS. 7A-7B illustrate a flow diagram representing a method 700 for conducting a conversation with the virtual agent system 102. The method 700 depicted in the flow diagram may be executed by, for example, the virtual agent system 102. Operations of the flow diagram of the method 700, and combinations of operation in the flow diagram, may be implemented by, for example, hardware, firmware, a processor, circuitry and/or a different device associated with the execution of software that includes one or more computer program instructions. The sequence of operations of the method 700 need not be necessarily executed in the same order as they are presented. Further, one or more operations may be grouped together and performed in a single step, or one operation may have several sub-steps that may be performed in parallel or in a sequential manner.

The method 700 includes a sequence of operations 702-726 performed by the virtual agent system 102 including the processor 210 to intelligently communicate with the user 108 to handle unstructured conversations with ease.

At operation 702, the method 700 includes receiving an input message from the user 108 at the virtual agent system 102. The input message may herein include one or more sentences or messages sent by the user. More specifically, the speech/text analyzer 202 of the virtual agent system 102 receives the input message from the user 108 via the dialog box 114 rendered at the web site 110.

At operation 704, the method 700 includes parsing, by the speech/text analyzer 202, the input message into multiple words or combination of words, and collates the parsed input message.

At operation 706, the method 700 determines an intent associated with the input message based on an analysis of the parsed input message. The parsed input message is matched with the plurality of input messages stored against respective intents in the intent model 216 to determine the intent of the input message. The intent model 216 comprises an algorithm and data to identify the intent of the input message. The intent model 216 stores a plurality of intents retrieved during prior conversations or intents associated with pre-stored plurality of input messages. In an example embodiment, the intent model 216 may comprise a pre-stored plurality of input messages along with respective intents as reference for the virtual agent system 102 to understand the intent of the input message. The input message includes questions asked by the user to the virtual agent system 102, questions, answers to questions posted by the virtual agent system 102 in response to the questions asked by the user, requests and commands to perform an action, among others. The intent model 216 further stores parsed data corresponding to pre-stored or prior input messages generated by the speech/text analyzer 202. The plurality of intents may represent a taxonomy or a class into which one or more input messages may be classified. Further, the plurality of input messages may be classified into one intent included in the intent model 216. It should be noted that one input message may comprise one or more intents.

At operation 708, the method 700 includes sending the determined intent to the plurality of bidding modules 208 along with a request to each bidding module to generate a bid (for example an answer or a solution to the input message from the user 108) appropriate for the given intent. In one example, the plurality of bidding modules 208 can be embodied within the processor 210, so the operation 708 may not be performed or may be optional.

At operation 710, the method 700 includes generating a plurality of bids by the plurality of bidding modules 208. Each of the bidding modules 208 also assigns an intent confidence score to its respective bid. The intent confidence score indicates an accuracy level of the bidding module's 208 understanding of the intent associated with the input message. Further, each of the bidding modules 208 also assigns a flag to its respective bid. In one non-limiting example, the flag can be one of a high value flag, a low value flag and a negative value flag. The high value flag indicates that a possibility of the bid resolving the user request associated with the input message is high, the low bid flag indicates that a possibility of the bid resolving the user request associated with the input message is low, however a solution can still be given which is relevant to the input message. Further, the negative value flag indicates that no relevant solution can be provided for the input message by the respective bidding module. In an example, the plurality of bidding modules 208 generates their bids simultaneously.

At operation 712, the method 700 includes sending, by each bidding module of the plurality of bidding modules 208, respective bids along with the respective intent confidence scores and flags to the auctioneer module 206.

At operation 714, the method 700 includes determining, by the auctioneer module 206, a quality of service associated with each bid of the plurality of bids submitted by the plurality of bidding modules 208. The quality of service indicates a measure of user convenience associated with each bid (i.e. each solution or answer) provided by respective bidding module.

At operation 716, the method 700 includes determining, by the auctioneer module 206, a winning bid from the plurality of bids submitted by the plurality of bidding modules 208 based on respective intent confidence scores and flags of the plurality of bids submitted by the plurality of bidding modules 208 and the determined quality of service associated with each bid of the plurality of bids. The remaining bids other than the winning bids are considered as non-winning bids. The auctioneer module 206 processes the plurality of bids simultaneously in order to avoid interruption due to non-winning bids.

At operation 718, the method 700 includes sending, by the auctioneer module 206, the winning bid along with its respective intent confidence score, flag and the quality of service to the processor 210.

At operation 720, the method 700 includes determining, by the processor 210, a resolution confidence score of the virtual agent system 102. The resolution confidence score indicates the virtual agent system's 102 capability to resolve the user request associated with the input message.

At operation 722, the method 700 includes deciding, by the processor 210, whether the winning bid can be presented to the user 108 based on the determined resolution confidence score of the virtual agent system 102.

At operation 724, if the resolution confidence score is high (e.g., greater than a threshold confidence score) then the processor 210 determines an appropriate response based on the winning bid using the response log 220 in the database 214. The processor 210 presents the appropriate response to the user 108 via the dialog box 114 otherwise, at operation 726, the processor 210 generates a regret message stating an incapability to resolve the user request received as the input message and presents the regret message to the user 108. The processor 210 may also present an explanatory remark providing reasons of the incapability to resolve the user request. Alternatively or additionally, the processor 210 may also present at least one non-winning bid to the user 108 via the dialog box 114 with an remark explaining why a certain task is unavailable for the time being. It should be noted that the processor may present responses corresponding to one of the winning bids, the top ranked bids or the non-winning bid via a dialog box 114 rendered on the user device 104. The responses can be presented in the form of text messages, voice messages or audio-video messages.

Figure 8A:
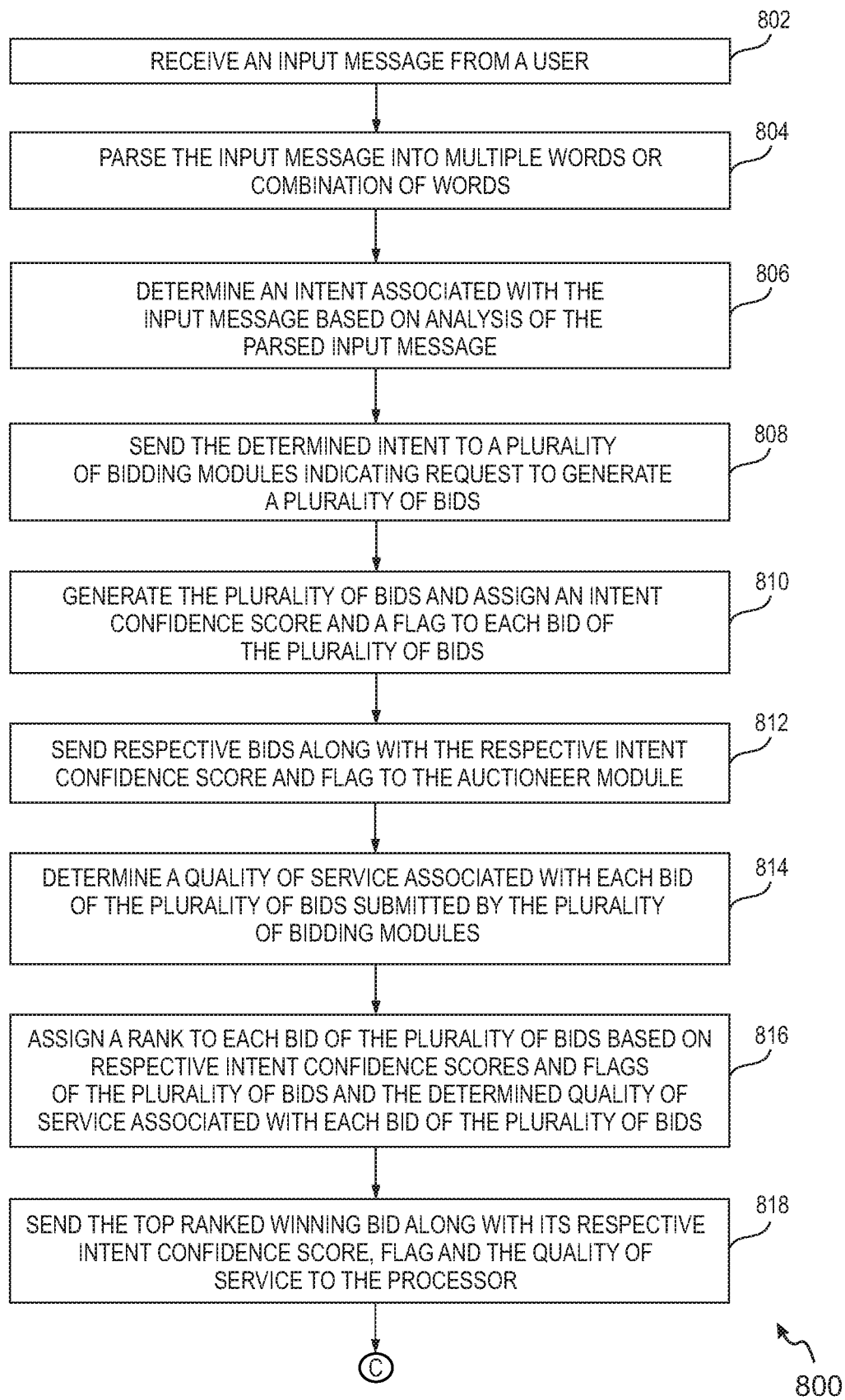
FIGS. 8A and 8B illustrate a flow diagram representing another method for conducting a conversation with a virtual agent system, in accordance with an example embodiment.
Figure 8B:
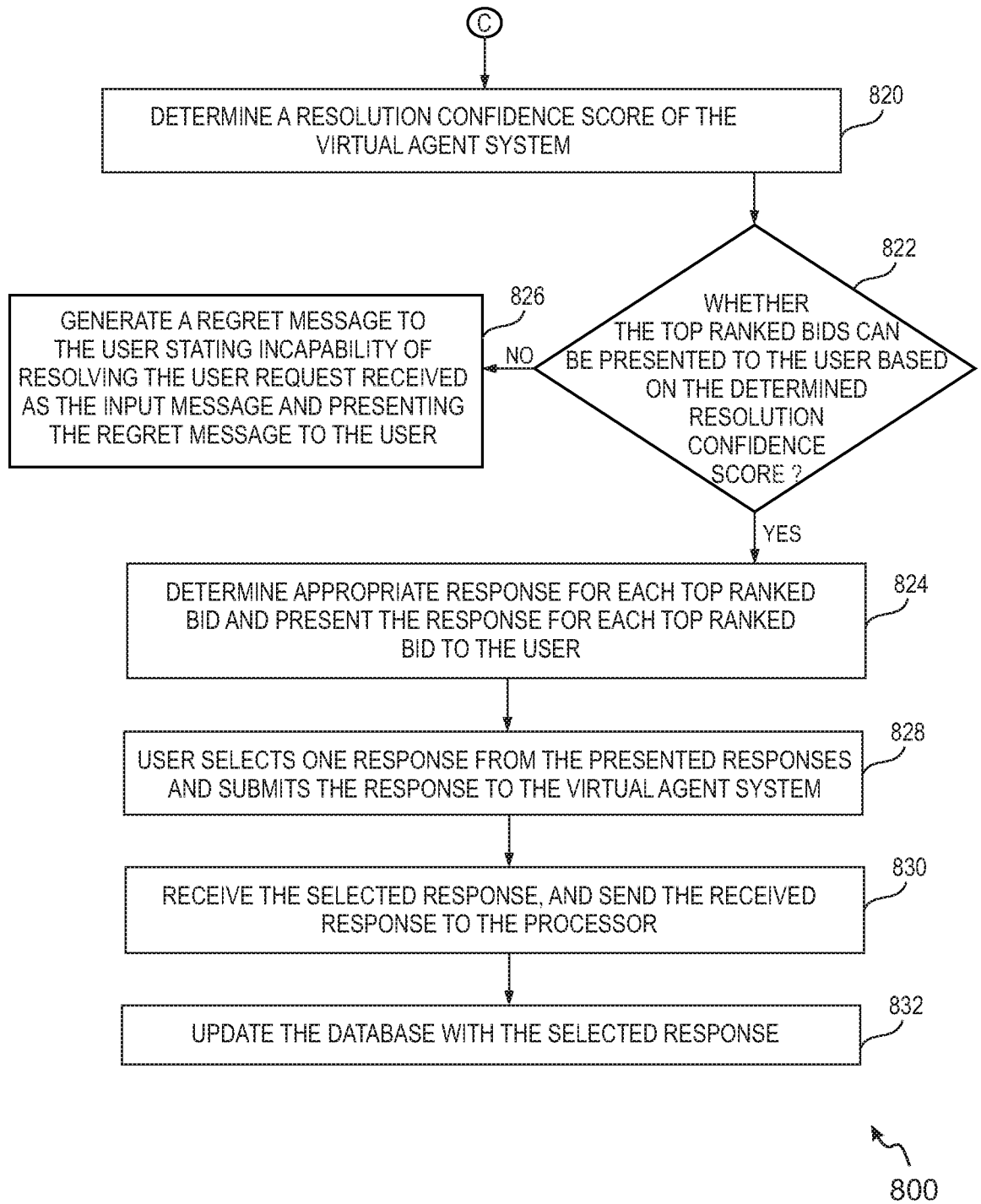

FIGS. 8A-8B illustrate a flow diagram representing another method 800 for conducting a conversation with the virtual agent system 102. The method 800 depicted in the flow diagram may be executed by, for example, the virtual agent system 102. Operations of the flow diagram of the method 800, and combinations of operation in the flow diagram, may be implemented by, for example, hardware, firmware, a processor, circuitry and/or a different device associated with the execution of software that includes one or more computer program instructions. The sequence of operations of the method 800 need not be necessarily executed in the same order as they are presented. Further, one or more operations may be grouped together and performed in a single step, or one operation may have several sub-steps that may be performed in parallel or in a sequential manner.

The method 800 includes a sequence of operations 802-826 performed by the virtual agent system 102 including the processor 210 to intelligently communicate with the user 108 to handle unstructured conversations with ease.

The operations 802, 804, 806, 808, 810, 812 and 814 are the same as or equivalent to operations 702, 704, 706, 708, 710, 712 and 714, described in FIGS. 7A-7B, respectively, so these operations are not explained again for the sake of brevity.

At operation 816, the method 800 includes assigning a rank, by the auctioneer module 206, to each bid from the plurality of bids submitted by the plurality of bidding modules 208 based on respective intent confidence scores and flags of the plurality of bids submitted by the plurality of bidding modules 208 and the determined quality of service associated with each bid from the plurality of bids. In an illustrative example, bids are received from 8 bidding modules, and bid 1 is ranked as $1^{st}$, bid 3 is ranked as $2^{nd}$, bid 5 is ranked $3^{rd}$, bid 7 is ranked 4th, bid 8 is ranked $5^{th}$, bid 2 is ranked $6^{th}$, bid 4 is ranked $7^{th}$ and bid 6 is ranked $8^{th}$.

At operation 818, the method 800 includes sending, by the auctioneer module 206, the top ranked bids (for example from $1^{st}$ to $3^{rd}$) along with their respective intent confidence scores, flags and the quality of service to the processor 210. In the above example, bids 1, 3 and 5 may be determined as the top ranking bids.

At operation 820, the method 800 includes determining, by the processor 210, a resolution confidence score of the virtual agent system 102. The resolution confidence score indicates the virtual agent system's 102 capability to resolve the user request associated with the input message.

At operation 822, the method 800 determines, by the processor 210, whether the top ranked bids can be presented to the user 108 based on the determined resolution confidence score of the virtual agent system 102.

At operation 824, if the resolution confidence score is high then the processor 210 determines an appropriate response for each top ranked bid using the response log 220 in the database 214, and the processor 210 presents the appropriate responses corresponding to each top ranked bid to the user 108 via the dialog box 114. Otherwise, at operation 826, the processor 210 generates a regret message to the user 108 stating an incapability to resolve the user request received in the input message, along with a remark explaining reasons of the incapability to resolve the user request and presents the regret message to the user 108 via the dialog box 114. It should be noted that the processor may present responses corresponding to one of the winning bids, the top ranked bids or the non-winning bid via a dialog box 114 rendered on the user device 104. The responses can be presented in the form of text messages, voice messages or audio-video messages.

At operation 828, the method 800 includes selecting, by the user 108, one response from the presented responses based on his/her preference and submits the selected response to the virtual agent system 102 using actionable buttons provided in the dialog box 114.

At operation 830, the method 800 includes receiving, by the speech/text analyzer 202, the selected response of the user 108, and sending the received response to the processor 210. At operation 832, the method 800 includes updating, by the processor 210, the database 214 with the selected response.

Figure 9:
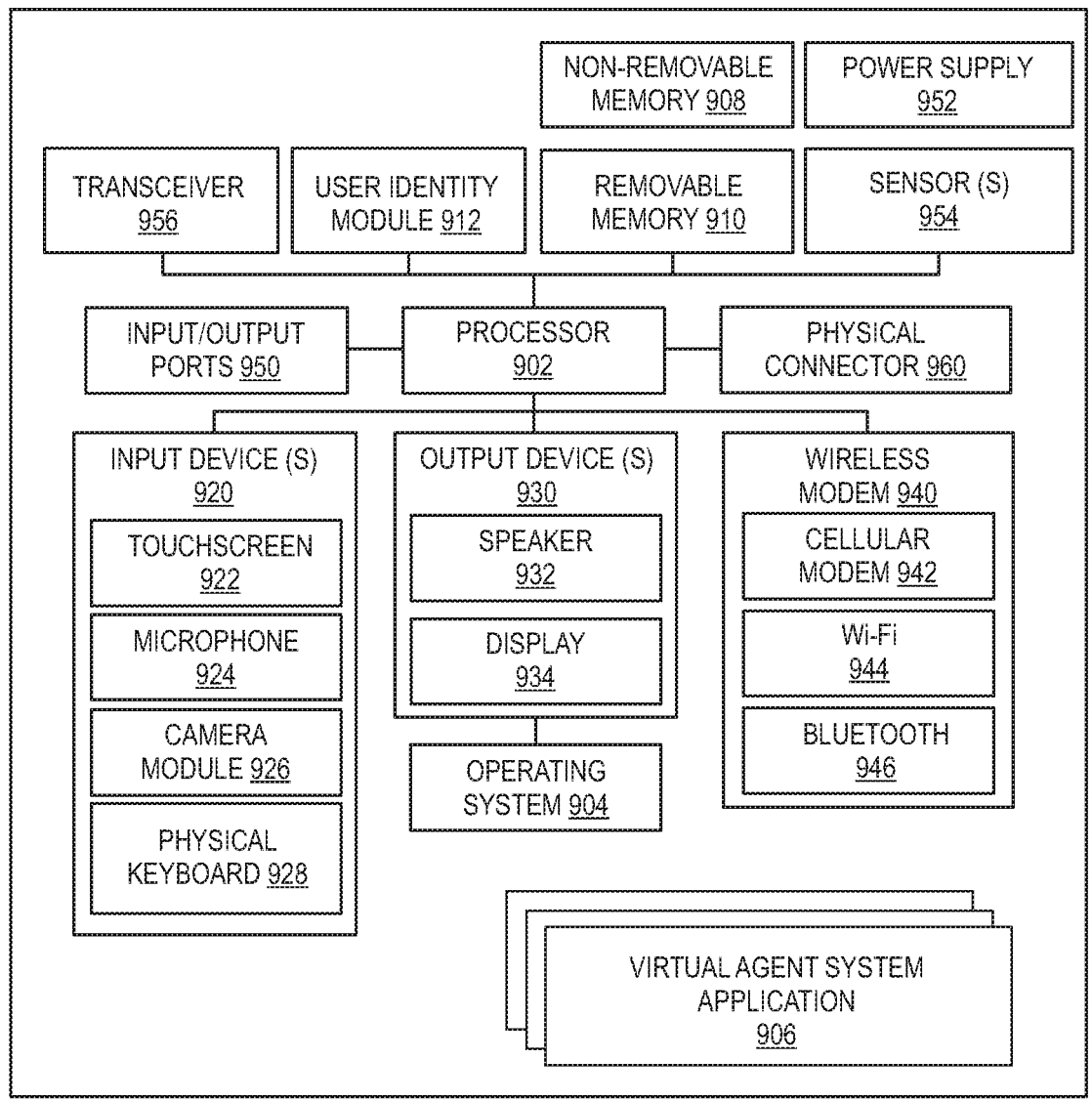
FIG. 9 is a simplified block diagram of a user device, in accordance with one embodiment of the present disclosure.

FIG. 9 shows a simplified block diagram of a user device, for example a mobile phone 900, that is capable of implementing the various embodiments of the present disclosure. The mobile phone 900 may be an example of user device 104. In an embodiment, the various operations related to conducting a conversation with a virtual agent system 102 can be facilitated using a virtual agent system application 906 (standalone application) installed in the mobile phone 900.

It should be understood that the mobile phone 900 as illustrated and hereinafter described is merely illustrative of one type of device and should not be taken to limit the scope of the embodiments. As such, it should be appreciated that at least some of the components described below in connection with that the mobile phone 900 may be optional and thus in an example embodiment may include more, less or different components than those described in connection with the example embodiment of the FIG. 9. As such, among other examples, the mobile phone 900 could be any of a mobile electronic device or may be embodied in any electronic device, for example, a cellular phone, tablet computer, laptop, mobile computer, personal digital assistant (PDA), mobile television, mobile digital assistant, or any combination of the aforementioned, and other types of communication or multimedia devices.

The illustrated mobile phone 900 includes a controller or a processor 902 (e.g., a signal processor, microprocessor, ASIC, or other control and processing logic circuitry) for performing such tasks as signal coding, data processing, image processing, input/output processing, power control, and/or other functions. An operating system 904 controls the allocation and usage of the components of the mobile phone 900 and support for one or more applications programs (see, virtual agent system application 906). The virtual agent system application 906 may include common mobile computing applications (e.g., web browsers, messaging applications) or any other computing application.

The illustrated mobile phone 900 includes one or more memory components, for example, a non-removable memory 908 and/or removable memory 910. The non-removable memory 908 and/or removable memory 910 may be collectively known as database in an embodiment. The non-removable memory 908 can include RAM, ROM, flash memory, a hard disk, or other well-known memory storage technologies. The removable memory 910 can include flash memory, smart cards, or a Subscriber Identity Module (SIM). The one or more memory components can be used for storing data and/or code for running the operating system 904 and the virtual agent system application 906. The mobile phone 900 may further include a user identity module (UIM) 912. The UIM 912 may be a memory device having a processor built in. The UIM 912 may include, for example, a subscriber identity module (SIM), a universal integrated circuit card (UICC), a universal subscriber identity module (USIM), a removable user identity module (R-UIM), or any other smart card. The UIM 912 typically stores information elements related to a mobile subscriber. The UIM 912 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The mobile phone 900 can support one or more input devices 920 and one or more output devices 930. Examples of the input devices 920 may include, but are not limited to, a touch/display screen 922 (e.g., capable of capturing finger tap inputs, finger gesture inputs, multi-finger tap inputs, multi-finger gesture inputs, or keystroke inputs from a virtual keyboard or keypad), a microphone 924 (e.g., capable of capturing voice input), a camera module 926 (e.g., capable of capturing still picture images and/or video images) and a physical keyboard 928. Examples of the output devices 930 may include, but are not limited to, a speaker 932 and a display 934. Other possible output devices can include piezoelectric or other haptic output devices. Some devices can serve more than one input/output function. For example, the touch screen 922 and the display 934 can be combined into a single input/output device.

A wireless modem 940 can be coupled to one or more antennas (not shown in the FIG. 9) and can support two-way communications between the processor 902 and external devices, as is well understood in the art. The wireless modem 940 is shown generically and can include, for example, a cellular modem 942 for communicating at long range with the mobile communication network, a Wi-Fi compatible modem 944 for communicating at short range with an external Bluetooth-equipped device or a local wireless data network or router, and/or a Bluetooth-compatible modem 946. The wireless modem 940 is typically configured for communication with one or more cellular networks, such as a GSM network for data and voice communications within a single cellular network, between cellular networks, or between the mobile phone 900 and a public switched telephone network (PSTN).

The mobile phone 900 can further include one or more input/output ports 950, a power supply 952, one or more sensors 954 for example, an accelerometer, a gyroscope, a compass, or an infrared proximity sensor for detecting the orientation or motion of the mobile phone 900, a transceiver 956 (for wirelessly transmitting analog or digital signals) and/or a physical connector 960, which can be a USB port, IEEE 1294 (FireWire) port, and/or RS-232 port. The illustrated components are not required or all-inclusive, as any of the components shown can be deleted and other components can be added.

Figure 10:
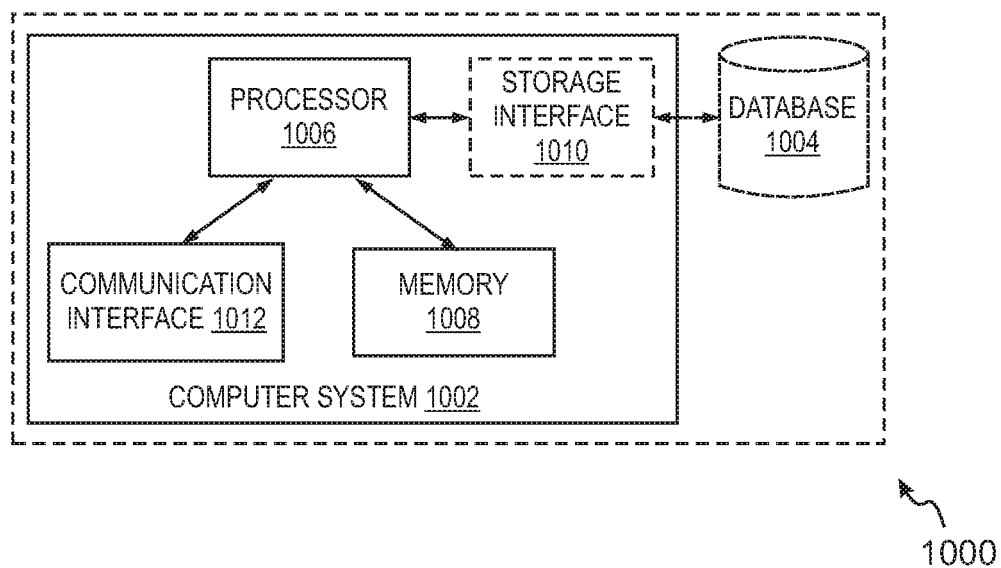
FIG. 10 is a simplified block diagram of a server, in accordance with one embodiment of the present disclosure.

FIG. 10 is a simplified block diagram of a server system 1000, in which the virtual agent system 102 may be stored, in accordance with one embodiment of the present disclosure. The server system 1000 includes a computer system 1002 and one or more databases such as a database 1004. The database 1004 may be an example of the database 214.

The computer system 1002 includes a processor 1006 for executing instructions. The processor 1006 may be an example of the processor 210. Instructions may be stored in, for example, but not limited to, a memory 1008 (an example of memory 204). The processor 1006 may include one or more processing units (e.g., in a multi-core configuration). The processor 1006 is operatively coupled to a communication interface 1012 such that computer system 1002 is capable of communicating with the user device 104.

The processor 1006 may also be operatively coupled to the database 1004. The database 1004 is any computer-operated hardware suitable for storing and/or retrieving data. The database 1004 may include multiple storage units such as hard disks and/or solid-state disks in a redundant array of inexpensive disks (RAID) configuration. The database 1004 may include, but is not limited to, a storage area network (SAN) and/or a network attached storage (NAS) system.

In some embodiments, the database 1004 is integrated within computer system 1002. For example, computer system 1002 may include one or more hard disk drives as database 1004. In other embodiments, database 1004 is external to computer system 1002 and may be accessed by the computer system 1002 using a storage interface 1010. The storage interface 1010 is any component capable of providing the processor 1006 with access to the database 1004. The storage interface 1010 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1006 with access to the database 1004.

Without in any way limiting the scope, interpretation, or application of the claims appearing below, a technical effect of one or more of the example embodiments disclosed herein is to provide virtual communication methods and virtual agent systems for intelligently communicating with the user. More specifically, the virtual agent system and method implements a bidding and auction model to efficiently interact with the user while dealing with unstructured and switched topic discussions. The virtual agent system comprises a plurality of bidding modules and an auctioneer module to determine an appropriate response that can be provided by the virtual agent system to the user. The plurality of bidding modules are individual task driven modules, therefore the effect of the present invention makes the individual task driven modules interact with and come into one platform (i.e., the auctioneer module) and thereafter the auctioneer module can determine a winning bid based on bids (i.e. solution or answers to the user's query). Further, the plurality of bidding modules generates their bids simultaneously and the auctioneer module processes the plurality of bids simultaneously in order to avoid interruption due to any non-winning bids. Hence, the virtual agent system is capable of interacting with the user during unstructured and switched topic conversations in an efficient and faster manner.

The disclosed methods with reference to FIGS. 1 to 10, or one or more operations of the flow diagram 700 and 800 may be implemented using software including computer-executable instructions stored on one or more computer-readable media (e.g., non-transitory computer-readable media), such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

The present disclosure is described above with reference to block diagrams and flowchart illustrations of methods and systems embodying the present disclosure. It will be understood that various blocks of the block diagram and flowchart illustrations, and combinations of blocks in the block diagrams and flowchart illustrations, respectively, may be implemented by a set of computer program instructions. These set of instructions may be loaded onto a general purpose computer, special purpose computer, or other programmable data processing apparatus, such that the set of instructions when executed on the computer or other programmable data processing apparatus create a means for implementing the functions specified in the flowchart block or blocks. Other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use are contemplated. It is understood that various omissions and substitutions of equivalents are contemplated as circumstance may suggest or render expedient, but such are intended to cover the application or implementation without departing from the spirit or scope of the claims.

What is claimed is:

1. A method for facilitating an automated conversation between a user and a virtual agent in a system comprising a processor, a storage and a communication interface, the method comprising:
  receiving, by the processor, an input message from the user;
  analyzing, by the processor, an intent of the input message;
  generating, by the processor and based on the intent of the input message, a plurality of bids for responding to the input message;
  assigning, by the processor, an intent confidence score to each bid from the plurality of bids;
  determining, by the processor, a winning bid from the plurality of bids based on the intent confidence score associated with each bid from the plurality of bids;
  generating, by the processor, a response based on the winning bid; and
  presenting a non-winning bid to the user with an explanatory remark related to the non-winning bid, the non-winning bid being one of the plurality of bids other than the winning bid.

2. The method of claim 1, further comprising:
determining a resolution confidence score based at least on a measure of a capability of the system to resolve a user request associated with the input message; and
presenting the response to the user based on the resolution confidence score.

3. The method of claim 1, wherein the intent confidence score corresponds to a measure of an accuracy of the virtual agent's understanding of a user request based on the input message.

4. The method of claim 1, wherein determining the winning bid is further based on a prior user conversation context and a quality of service associated with each bid from the plurality of bids.

5. The method of claim 4, wherein the quality of service corresponds to a measure of user convenience associated with each bid from the plurality of bids.

6. The method of claim 1, wherein determining the winning bid is further based on at least one of: one or more heuristics and manual rules, and one or more trained machine learning modules.

7. The method of claim 1, wherein generating the plurality of bids further comprises assigning a flag to each bid from the plurality of bids, wherein the flag assigned to each bid indicates a measure of a possibility of the bid resolving a user request associated with the input message, and wherein the flag comprises one of a high value flag, a low value flag and a negative value flag.

8. The of claim 1, wherein the input message comprises at least one of: a text message, a voice message, and an audio-video message.

9. A system for facilitating an automated conversation with a user, the system comprising:
at least one processor;
a memory to store instructions that, when executed by the at least one processor, cause the system to:
receive an input message from the user;
analyze an intent of the input message;
generate, based on the intent of the input message, a plurality of bids for responding to the input message;
assign an intent confidence score to each bid from the plurality of bids;
determine a winning bid from the plurality of bids based on the intent confidence score associated with each bid from the plurality of bids;
generating a response based on the winning bid; and
present a non-winning bid to the user with an explanatory remark related to the non-winning bid, the non-winning bid being one of the plurality of bids other than the winning bid.

10. The system of claim 9, wherein the system is further caused at least in part to:
determine a resolution confidence score based at least on a measure of a capability of the system to resolve a user request associated with the input message; and
present the response to the user based on the resolution confidence score.

11. The system of claim 9, wherein the intent confidence score corresponds to a measure of an accuracy of the virtual agent's understanding of a user request based on the input message.

12. The system of claim 9, wherein the system is further caused at least in part to determine the winning bid based on a prior user conversation context, and a quality of service associated with each bid from the plurality of bids.

13. The system of claim 12, wherein the quality of service corresponds to a measure of user convenience associated with each bid from the plurality of bids.

14. The system of claim 9, wherein the system is further caused at least in part to determine the winning bid based on at least one of: one or more heuristics and manual rules, or one or more machine learning modules.

15. The system of claim 9, wherein the system is further caused at least in part to assign a flag to each bid from the plurality of bids, wherein the flag assigned to each bid indicates a measure of a possibility of the bid resolving a user request associated with the input message, and wherein the flag comprises one of a high value flag, a low value flag and a negative value flag.

16. The system of claim 9, wherein the input message comprises at least one of: a text message, a voice message, and an audio-video message.

17. A method for facilitating an automated conversation between a user and a virtual agent in a system comprising a processor, a storage device and a communication interface, the method comprising:
receiving, by the processor, an input message from the user;
analyzing, by the processor, an intent of the input message;
generating, by the processor and based on the intent of the input message, a plurality of bids for responding to the input message;
assigning, by the processor, an intent confidence score to each bid from the plurality of bids;
assigning, by the processor, a rank to each bid from the plurality of bids based on the intent confidence score associated with each bid from the plurality of bids;
selecting, by the processor, top ranked ones of the plurality of bids based on the ranking of each bid from the plurality of bids; and
presenting, by the processor, a plurality of responses corresponding to the selected top ranked bids.

18. The method of claim 17, further comprising:
determining a resolution confidence score based at least on a measure of a capability of the system to resolve a user request associated with the input message; and
presenting the plurality of responses to the user based on the resolution confidence score.

\* \* \* \* \*